United States Patent [19]
Abita et al.

[11] Patent Number: 5,838,238
[45] Date of Patent: Nov. 17, 1998

[54] ALARM SYSTEM FOR BLIND AND VISUALLY IMPAIRED INDIVIDUALS

[75] Inventors: Joseph L. Abita, Boyds; Ronald L. Stanford, Elkridge; Bliss G. Carkhuff, Laurel, all of Md.

[73] Assignee: The Johns Hopkins University, Baltimore, Md.

[21] Appl. No.: 818,470

[22] Filed: Mar. 13, 1997

Related U.S. Application Data

[60] Provisional application No. 60/013,353, Mar. 13, 1996.

[51] Int. Cl.$^6$ .................................................. G08B 23/00
[52] U.S. Cl. ......................... 340/573; 340/555; 340/556; 340/407.1; 250/DIG. 1
[58] Field of Search ............................. 340/407.1, 555, 340/556, 525, 944, 825.19, 573; 434/112, 116; 250/DIG. 1

[56] References Cited

U.S. PATENT DOCUMENTS

| 3,852,592 | 12/1974 | Scoville et al. | 340/555 |
|---|---|---|---|
| 3,858,043 | 12/1974 | Sick et al. | 340/555 |
| 3,924,130 | 12/1975 | Cohen et al. | 250/342 |
| 3,993,407 | 11/1976 | Moricca et al. | 340/407.1 |
| 4,212,116 | 7/1980 | Hajduch | 340/556 |
| 4,576,694 | 3/1986 | Touchton et al. | 340/573 |
| 4,620,816 | 11/1986 | Kupfer | 434/112 |
| 4,648,710 | 3/1987 | Ban et al. | 356/135 |
| 4,712,003 | 12/1987 | Ban et al. | 250/221 |
| 4,947,152 | 8/1990 | Hodges | 340/573 |
| 5,119,069 | 6/1992 | Hershkovitz et al. | 340/555 |
| 5,126,718 | 6/1992 | Doctor | 340/567 |
| 5,266,807 | 11/1993 | Neiger | 250/353 |
| 5,302,942 | 4/1994 | Blau | 340/556 |
| 5,460,124 | 10/1995 | Grimsley et al. | 340/573 |
| 5,552,767 | 9/1996 | Toman | 340/555 |
| 5,608,381 | 3/1997 | McCarney et al. | 340/573 |
| 5,610,913 | 3/1997 | Tomonaga et al. | 370/219 |
| 5,616,901 | 4/1997 | Crandall | 434/112 |

FOREIGN PATENT DOCUMENTS

| 2628968 | 9/1989 | France | 434/112 |
|---|---|---|---|

Primary Examiner—Jeffery A. Hofsass
Assistant Examiner—Van T. Trieu
Attorney, Agent, or Firm—Carla Magda Krivak

[57] ABSTRACT

A device which assists those who are visually impaired or handicapped and, in particular, a system for warning blind or visually impaired travelers that they have entered a potentially dangerous area proximal to an edge of boarding platforms of the type typically found in railway and other types of transit systems. An Infrared Integrated Indicating System (IRIIS) includes an array of optical emitters and a portable detector/warning device to be held by a visually handicapped traveler. The emitters create a beam of light which bathes a section of the platform proximal to the platform edge. As the visually handicapped traveler moves into a region of the platform covered by the beam of light, a first indicator, such as sensors in the warning device, is activated and by audio, tactile or other stimuli, alert the visually handicapped traveler of entry into a hazard zone. A second indicator provides additional confirmation to the visually handicapped traveler that doors are open as he or she prepares to board.

41 Claims, 6 Drawing Sheets

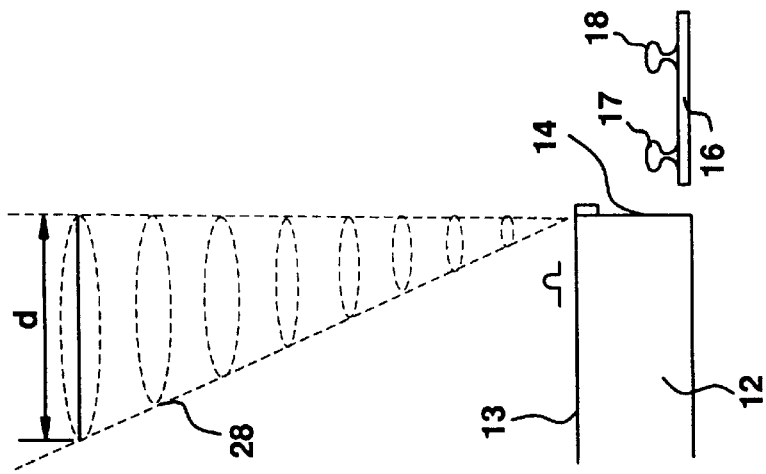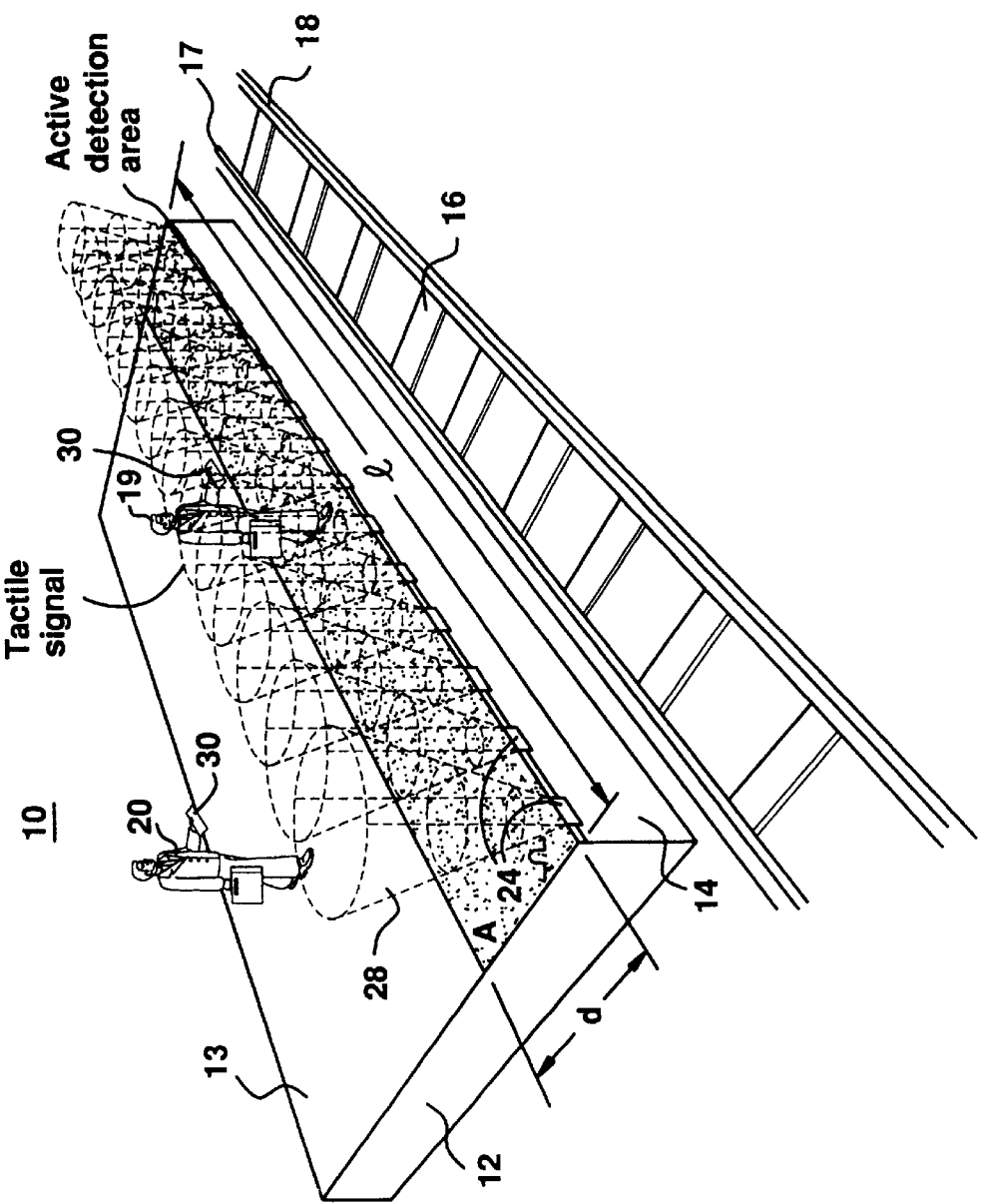

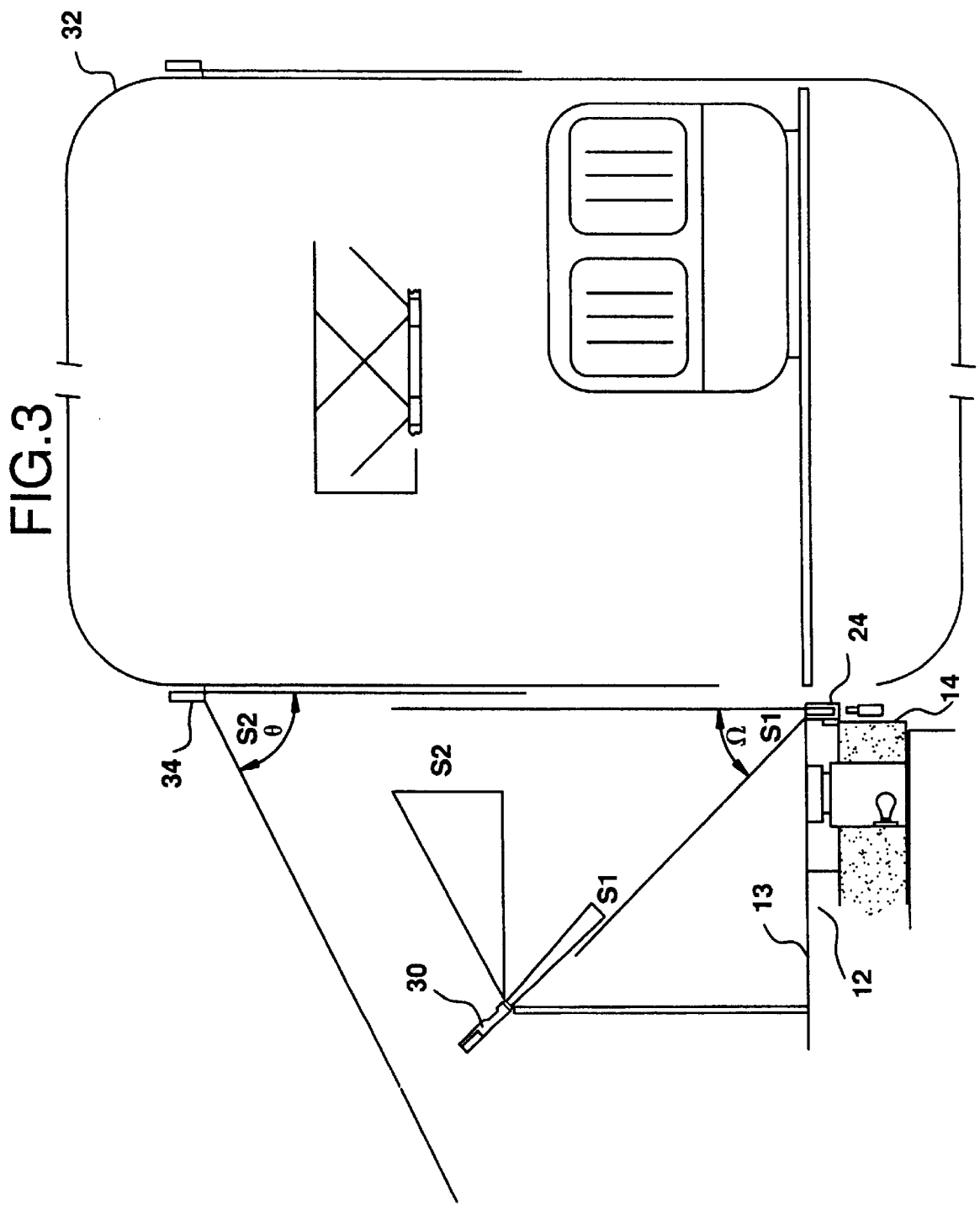

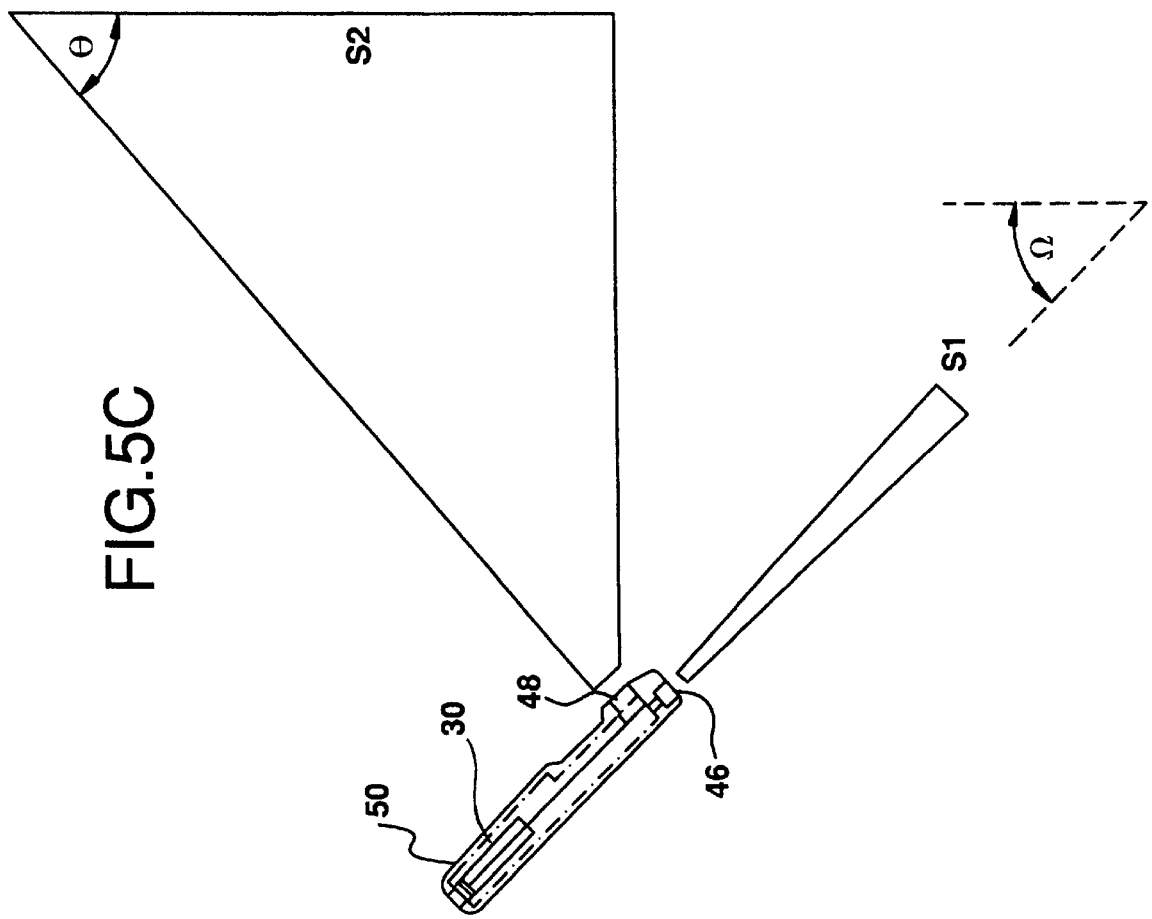

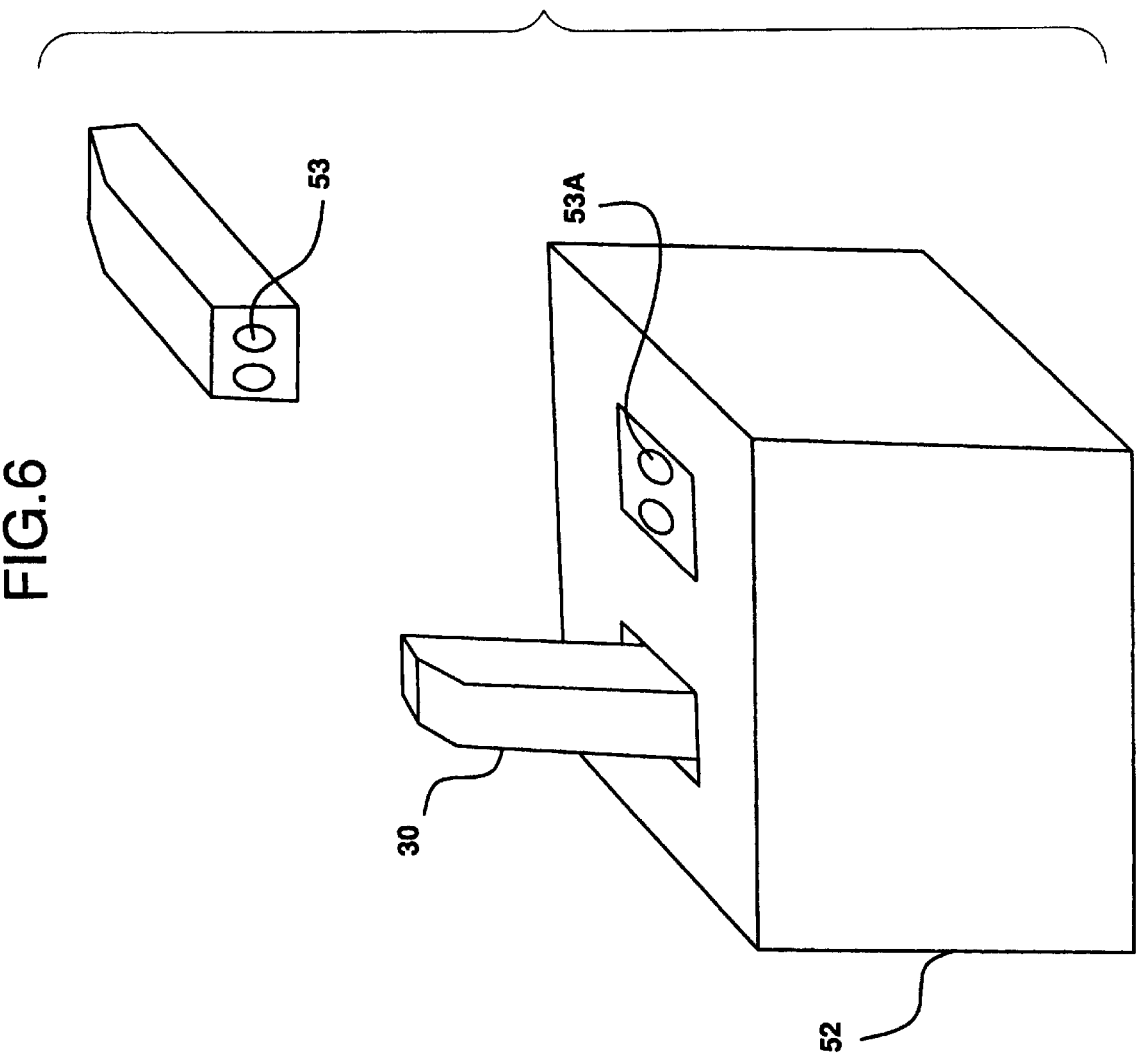

ALARM SYSTEM FOR BLIND AND VISUALLY IMPAIRED INDIVIDUALS

This application claims the benefit of U.S. provisional application No. 60/013,353, filed Mar. 13, 1996.

BACKGROUND OF THE INVENTION

1. Field of the Invention

The present invention relates to a system for ensuring the safety of the visually handicapped such as those afflicted with blindness or near blindness, and, particularly, to a system which assists the visually impaired and provides maximum personal safety when moving on or about a platform of a public railway transit system while approaching a train with the intention of boarding one of its coaches.

2. Description of the Related Art

Although no completely reliable statistics are available, the most widely used estimates in 1994 place the legally blind population of the United States at 2.24 per thousand (that is, approximately 500,000 people). Approximately 50,000 people become legally blind annually, and many others have enough visual loss to pose a serious employment problem (see *General Ophthalmology*, D. G. Vaughn, et. al., Norwalk, Conn., APPLETON & LANGE, 1992).

The expansion of high speed railway transit systems to many major cities throughout the world, while viewed by many as merely another sign of technological achievement associated with our modern society, is generally undertaken with less than adequate consideration of the problems of persons who are physically handicapped. It is unfortunate that this sweeping hypothesis finds greater application when applied to the blind. The requirements imposed on designers of public railway transit systems by the Americans with Disabilities Act is a step in the direction of recognizing the needs of a minority segment of the population using modern technology to enhance the safety and accessibility of mass transit systems for the blind or visually impaired. One such effort was prepared in response to a request by the Washington Metropolitan Area Transit Authority (WMATA) for assistance to comply with requirements recently laid down by the Federal Transit Authority. The federal requirements, in turn, are intended to promote development to improve the accessibility of rail systems to users who are visually impaired. One particular desire underpinning these requirements is to design ways to identify platform edges and other potential safety hazards to a class of commuters who lack the sense of sight necessary to detect and avoid such hazards on their own. Although the particular requirements of the Federal Transit Authority are quite specific as to the set of users targeted to benefit, design requirements relate to a general type of system in which a personal user interface is used to translate an environmental signal of one type into sensory user inputs. When placed into practice this concept may be implemented by replacing visual cues not ordinarily available to the blind or visually impaired with substitute inputs such as the auditory or tactile kind.

The Federal Transit Authority originally mandated the installation of strips of truncated domes or bumps mounted on the floor of a train platform near a rail pit edge, in two-feet widths, on the theory that the domes would act as a tactile underfoot warning to the blind as they walked over this region. Promoters of this design assume the premise that when such bumps are detected underfoot the blind subway user will recognize impending danger and come to a halt before reaching the edge of the platform. WMATA, with the support of the National Federation of the Blind (NFB), objected to this concept (referred to as the Maginot Line concept) for several reasons, including the following:

1. The bump strips are not effective enough: visually impaired travelers are first made aware of the platform edge by the bumps at a distance which is relatively short when one considers the range of human reaction times—most people must slow down and anticipate the edge long before covering the final two feet.
2. The bump strips are potential safety hazards to sighted as well as visually impaired people as something to trip over, for example, those wearing high heels, operators of wheelchairs, strollers and the like. At the very least, they draw attention by a non-aesthetic marring of the subway platform to interfere with the habits of members of the traveling public through an effort to accommodate a small number of commuters.
3. Bump strips are unnecessary for many skilled blind or visually impaired users who can navigate efficiently with sound cues and by cane without interfering with habits of sighted passengers.
4. The bump strips do not address other serious difficulties in subway stations, such as the ability to locate and discriminate openings in coaches and make the distinction of open doors from the opening between the coaches
5. There are other problems such as the location of escalators, elevators, fare card machines, etc., that cannot be handled by the idea of bump strips.
6. Any solution proposing platform bumps is expensive based on WMATA estimates to install and maintain such a system.
7. The use of the bump strips is not voluntary.
8. There is no distance-from-the-platform edge information which can be extracted from this implementation.

The NFB has recommended that technology be applied to develop an equivalent facilitation rail transportation warning system that is less costly, has the additional benefit of being voluntary (for users) and provides additional information. The warning signal should be imperceptible to sighted users and should not require blind, or visually impaired users who wish to take advantage of the technology, to do anything extraordinary to use it. Moreover, in using the technology one should feel comfortable and not require extensive or complex training. Such a system should be easy to use, even by people who have little or no familiarity with technical devices. Moreover, its users should not be made obvious to others in the environment.

Intruder indication is provided for in U.S. Pat. No. 5,126,718 but the system described therein depends upon the reflection of infrared radiation from an intruder entering a protected field of view. The system described in U.S. Pat. No. 4,712,003 provides a blind person guide device using sonar to indicate bearing and distance from an object in which the distance to an object lying in the direction in which the range finder faces is transmitted or perceived as vibrations felt through the handle of a walking stick. Neither of these two prior art apparatus addresses a particular danger faced by blind people while using rail transportation. U.S. patent application Ser. No. 60/005,180, filed Sep. 27, 1995, entitled Passive Alarm System for Blind and Visually Impaired Individuals, and assigned to the same assignee as the instant application, reaches in the direction of the blind and visually handicapped and, in particular, it discloses a system for warning blind or visually impaired travelers that they have entered a potentially dangerous area approaching the edge of a boarding platform of the type typically found in public railway transit systems. The above system consists of an array of infrared emitters and a portable detector/warning device held by the blind traveler. A plurality of emitters create a beam of infrared light which is directed to a section of the platform proximal to the platform edge. As the traveler moves into the region of the platform defined by the radiation, the sensor in the warning device is activated. The traveler is then alerted of entry into the danger zone by audio, tactile or other stimuli. While the system described in the co-pending patent application represents a very important advance in the application of technology for securing to the blind and visually handicapped a much higher level of safety when using public railway transit systems, it does not address specific beneficial design and implementation configurations and does not include features that allow blind travelers to know that car doors are open and to distinguish between the open car doors of a railway coach and a gap between adjacent coaches.

SUMMARY OF THE INVENTION

The present invention offers to the visually handicapped an escape from potential injury by tolerating no penetration of the area proximal to the edge of a public railway transit platform without sufficient warning being issued in a form unreservedly detectable by the blind. Such assistance enables a handicapped person to use rail transportation with less anxiety. Public transportation, especially of the kind requiring unguided assistance to the boarding area at an edge of a train platform, is fraught with hazards to a blind person intent on carrying out an independent existence with a minimum of public assistance. The present invention provides an electronic detection system, known as an Infrared Integrated Indicating System (IRIIS). This system provides one type of vibratory stimulus to a user when approaching a platform edge and a second type of vibratory stimulus to a user for identifying the status and location of car doors once the platform edge has been reached.

Accordingly, an object of the present invention is to reduce risk of injury by providing a platform edge warning system for blind and visually impaired persons using public railway transit systems or to identify hazards and provide information in other situations of travel by handicapped persons.

Another object of the present invention is to provide a warning signal that is aesthetically pleasant and generally undetectable to persons having normal sight.

A further object of the present invention is to provide a warning system which does not interfere in any way with an existing operation.

Still another object of the present invention is to provide a warning system that is discreet, inconspicuous, clearly discriminatable, personal, and usable strictly at the option of a visually impaired individual.

Yet a further object of the present invention is to provide an architecturally sound and aesthetically pleasing physical implementation easily engendered into the physical environment of the typical above-ground or below-ground public railway transit systems.

Another object of the present invention is to provide for the blind and visually impaired traveler additional confirmation that passenger car doors are open as he or she prepares to board a train.

Yet another object of the present invention is to provide a fail safe system in its use and operation.

These objects, together with other objects and advantages which will be subsequently apparent, reside in the details of construction and operation as more fully described and claimed hereinafter, reference being had to the accompanying drawings forming a part hereof, wherein like reference numerals refer to like parts throughout.

BRIEF DESCRIPTION OF THE DRAWINGS

FIG. 1 is a perspective view of a platform edge warning system according to an embodiment present invention;

FIG. 2 is a fragmentary view of the system shown in FIG. 1 showing a radiated field relative to the edge of the platform;

FIG. 3 shows the relationship of the platform and train emitters in a warning system according to the present invention;

FIGS. 5A–5C show several views of a hand held detector used in the warning system according to the present invention; and FIG. 6 is a diagram showing a detector and holder according to the present invention.

DESCRIPTION OF THE PREFERRED EMBODIMENT

Figure 4C:
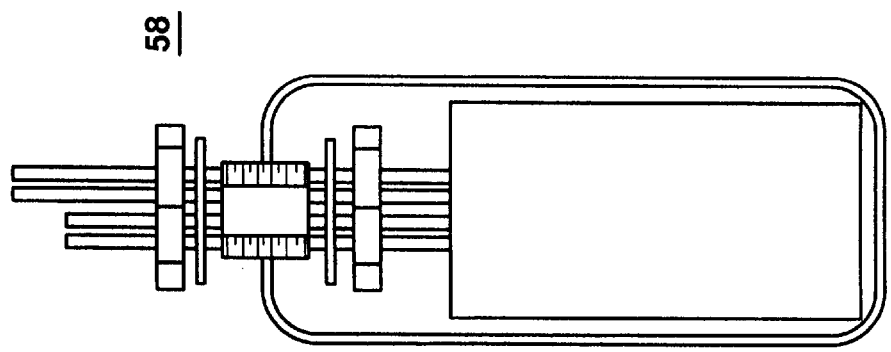
FIGS. 4A–4C show, in elevation and cutaway diagrams, one form of platform emitters, train emitters, and a power supply, respectively, according to the present invention.

As shown in FIG. 1, one embodiment of the present invention is given as a platform edge warning system. The present invention is not limited thereto, however, the present invention is explained using a railway transit system as an example. The platform edge warning system is generally designated as 10 and comprises a platform 12 whose floor 13 terminates at an edge 14 proximal to a railway 16 having parallel rails 17 and 18 which support a passenger vehicle (not shown) controlled to come to complete halt at platform 12 for the purpose of permitting passengers on the platform to board or disembark. Serious injuries and deaths have been documented as a result of contact with trains made by travelers who accidentally proceed beyond the edge of the platform while a train is passing. For the blind and the visually impaired, the danger is even more acute because of no known system available to the blind for distinguishing between the open doors of a car or coach and the space where two adjacent cars or coaches are coupled to each other.

Two such travelers 19 and 20 are pictured standing on the floor 13 of platform 12 and both are assumed for the sake of illustration to be blind or visually impaired to the extent that they are unable to visually determine with exactness the location of the edge 14 of the platform 12 while remaining a safe distance from the track. An array of emitters 24 is mounted on the edge 14 of platform 12 at calculated intervals over a length of the platform designated l. The array of emitters 24 can be mounted, for example, flush with the platform 12, along side the platform 12, in the platform 12, etc. This embodiment shows the emitters 24 mounted on the edge 14 of the platform for ease and cost effectiveness. The emitters 24 are spaced uniformly longitudinally on the platform 12 in a direction substantially parallel to the platform edge 14. The emitters 24 are housed in a housing that is made of a material that is immune to external electromagnetic radiation interference and is strong enough to hold up in a rough environment, inside and outside, and is impervious to liquid penetration. The emitters 24 are phase coherent to provide a uniform detected boundary line free of dead spots. Emitters are spaced in the array to offer safe failure of widely separated emitters 24. The emitters 24 are adapted to create a well defined and upwardly directed hazard zone within the boarding area proximal to the platform edge 14 and demarcated in FIG. 1 by the width d. The horizontal separation of the emitters 24 and their interaction with the platform edge 14 and transparent window (39 in FIG. 6) establishes the dimensions of the hazard zone.

In operation, each of the emitters 24 emits a coherent amplitude modulated radiated signal of upwardly directed energy represented herein for convenience by dashed lines 28 which define a hazard zone A one side of which is parallel and adjacent with the entire edge 14 of the platform 12. The dimensions of the hazard zone A, that is, length l, are adjusted by design so that the upwardly directed beam region is shaped to be intercepted by the person of a traveler during his or her entry into the hazard zone A. A nominal warning zone width l is selected subject to environmental influences. In this application, the hazard zone A is between three to four feet from the edge 14 of the platform 12. Traveler 20, on the other hand, is staged in FIG. 1 at a position on platform 12 beyond or outside the hazard zone A. It further can be seen from FIG. 1 that the beam of radiation co-extensive with the hazard zone A extends up to and includes the section of the platform 12 vertically proximal to the hazard zone A. For the platform edge warning system 10 to operate as intended, each traveler 19 and 20 is equipped with a portable detector 30, which is described in detail hereinafter. The detector 30 can be obtained at a kiosk, or other area, when entering a rail system. The detector 30 can also be personally owned or obtained outside the rail system. The detector 30 is housed in a holder 52 as shown in FIG. 6.

Figure 5A:
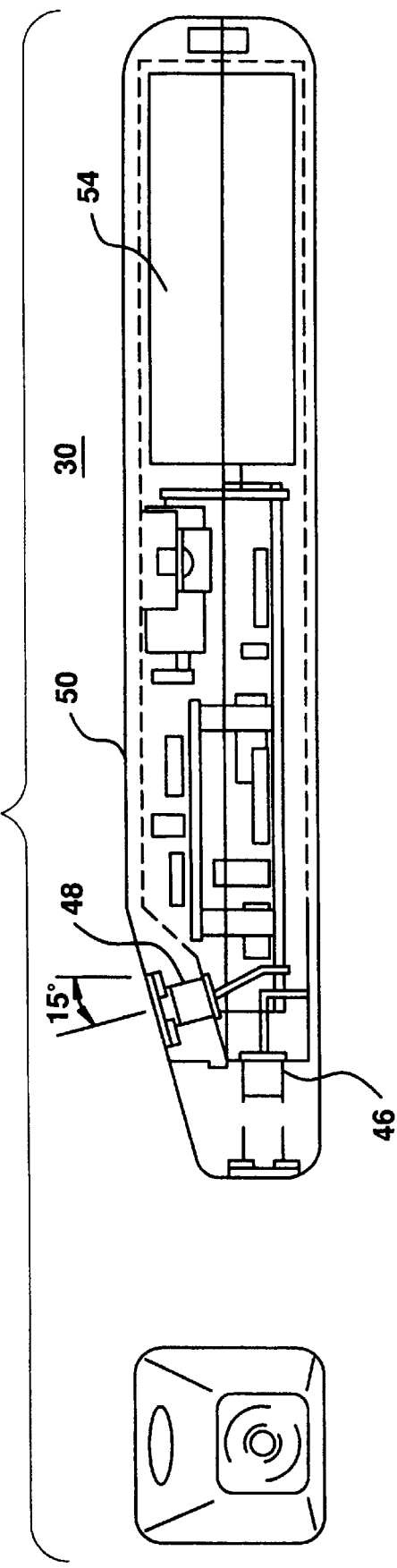
Figure 5B:
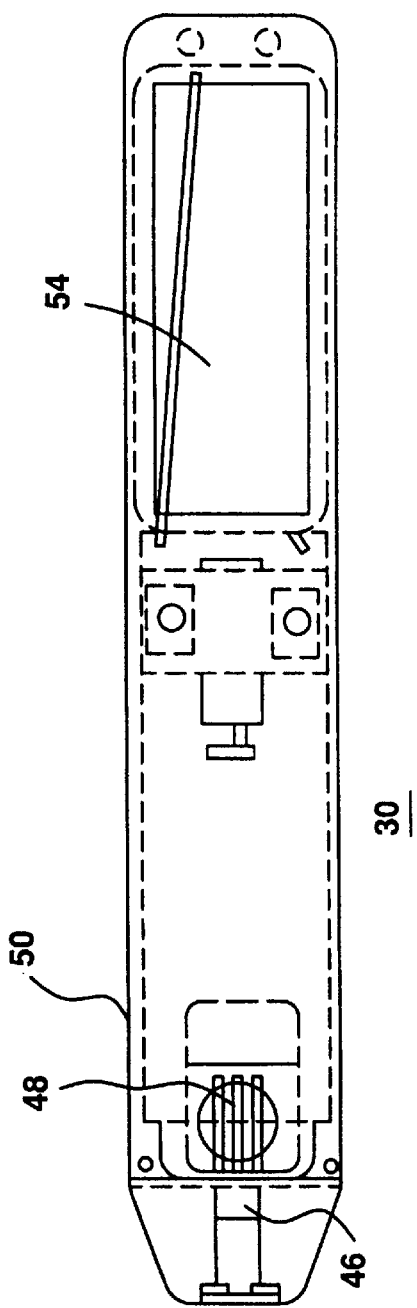

In one embodiment, the detector 30 includes a magnetic switch as indicated by the terminals 53 shown in FIG. 6. When the detector 30 is placed in the holder 52 power is switched OFF. When the detector 30 is removed from the holder 52 power is switched ON. This conserves battery power when the detector 30 is not in use. The batteries 54 in the detector 30 can include one use expendable batteries or rechargeable batteries as shown in FIGS. 5A and 5B. If the detection 30 contains rechargeable batteries, the holder 52 is also the recharger. To ensure that the detector 30 is functioning properly, it is tested by holding it up to a tester (not shown) which emits signals the same as those of the emitters 24. If the detector 30 does not react to the emitted signals, it is determined not to be working and a different detector 30 is issued.

The detector 30 can be directly held by the visually impaired or blind person, additionally a wrist strap can be used. The wrist strap ensures that if the detector 30 is dropped it will not fall to the ground where it will be difficult to find. The detector 30 can also be effective in other than hand held applications, such as, on a probing cane, attached to a wheel chair, etc.

The detector 30 contains a radiation sensitive element selectively tuned to the frequency of the signals from the emitters 24. The detector 30 held by traveler 19 will become activated the moment the detector 30 is exposed to the radiation from the emitters 24 defining the hazard zone A entry line which is parallel to the platform edge 14. Being outside the hazard zone A at this point, the detector 30 held by traveler 20 will not be affected. Detectors 30 thus are designed to provide a warning signal to a user upon being activated. The warning signal can include an auditory signal, vibratory signal, electronic signal, etc. Until traveler 20 enters the hazard zone A, the detector 30 being carried by the traveler 20 will not be activated.

Although some consideration was given to use emitters emitting over different portions of the frequency spectrum, such as ultrasound, microwave, and radio frequency alternatives, it is preferred for this embodiment to rely on an optical signal which provides better results than the alternatives. Optical, in this case, refers to visible or near visible light, the extreme limits of the optical spectrum being about 100 nanometers (0.1 micrometers or $3 \times 10^{15}$ hertz) in the far ultraviolet and 30,000 nanometers (30 micrometers or $10^{13}$ hertz) in the far infrared. No concern is therefore required regarding RF or microwave noise or interference nor do any difficulties arise because of radiation health hazards. The design selection for the type of warning issued from the detectors 30 in this embodiment is coded vibrotactile stimulation. This is advantageous over synthesized speech or other audible warnings because it is discrete, unobtrusive, and is not affected by the high ambient sound levels routinely found in train, bus or subway stations.

As noted above, the present invention discloses a system for indicating to persons with visual impairment proximity to the platform edge 14 of a railway system. The system also sharply defines a hazard zone A. The hazard zone A should preferably be at least a minimum of twenty-four inches measured horizontally from the platform edge A. The IRIIS of the present invention therefore includes emitters 24 installed at appropriate locations throughout a station with the emitters 24 providing an encoded signal to the detectors 30. The detectors 30 there upon decoding the encoded signal and providing an indication to the carrier of the detector 30 that a warning signal is being received. With the warning clearly registering, a traveler will halt any further advance toward the edge 14 of the platform 12.

FIG. 3 is a detailed diagram of the system according to the present invention used, for example, in a transit system. As shown, an outline of a coach 32 forming part of a passenger train, such as subway car in, for example, the WMATA Metrorail system in the Washington, D.C. metropolitan area, is stopped at a platform 12 whose edge 14 terminates proximal to one side of the coach 32. It is understood that the train has come to a complete halt at the platform 12 for the purpose of permitting passengers on the platform 12 to board or disembark from the coaches 32. In FIG. 3, one of the emitters 24 is shown supported by the platform 12 proximal to the edge 14. The emitter 24 provides an upwardly directed optical beam, identified herein as S1, which subtends an angle $\Omega$ which, in this embodiment, is approximately 45°. At the same time, mounted on coach 32 in a location above each door of the coach 32 is shown one of a plurality of emitters 34. Emitters 34 operate in dependence on the condition of the train door, e.g., opened or closed, and provide such an indication to a visually impaired traveler. Further, emitters 34 are used to assist a visually impaired individual to a location of an open door of a coach 32. Each of the emitters 34 provides a downwardly directed optical beam, directed toward the platform 12. The beam is identified herein as S2 which in this embodiment subtends an angle $\theta$ which is approximately 60°. The angles $\Omega$ and $\theta$ can include a broad range of angles. The detector 30 in the hand of a passenger (not shown) is tilted downwardly at an angle of approximately 45°. This allows the detector 30 to be in a position to receive optical signals S1 and S2. The angle that the detector 30 is held is dependent upon the angle $\theta$ and the angle $\Omega$. The angles indicated are given as examples and appear at this time to be preferable for the purposes of this embodiment.

As noted above, each of the emitters 24 provides an encoded radiated signal of specifically configured upwardly directed energy over a field represented by the angle Ω of approximately 45° thereby defining a hazard zone A one side of which is contiguous with the edge 14 of the platform. The platform edge 14 in this instance helps to configure the region of the energy field. While not actually depicted in FIG. 3, but shown by the ellipses in FIG. 1, it will be understood that the signals from emitters 24 overlap each other to an extent that the detector 30 will intercept the beam S1 and thus register an alarm which warns of any approaching portion of the platform edge 14. The detector 30 can also detect more than one signal. In this embodiment, the detector 30 includes a second radiation sensitive element which is specifically tuned to the coded signal from emitters 34. The radiation sensitive elements in the detector 30 in this embodiment can include sensors. Many different types of sensors are capable of being used, and the invention is not limited to a particular type of sensor.

The detector 30 can become activated in two ways—by the detector 30 exposed to the beam S1 from the emitters 24 and by a position in front of the open car doors of the coach 32 where the detector 30 is exposed to the beam S2 from the emitters 34. Therefore, the detector 30 in the hand of a traveler intending to enter the train will receive one type of signal which advises of the proximity of the platform edge 14 and a different type of signal which indicates that the traveler is in front of the open doors of the coach 32. As one of several possible embodiments, applicants have preferred to design the detector 30 so that it will provide two distinct signals, a pulsed vibration to indicate entry into the hazard zone A (the alert typically would begin within three to four feet of the platform edge 14) followed by a continuous vibration once the passengers have positioned themselves before open doors of the coach 32.

Figure 4B:
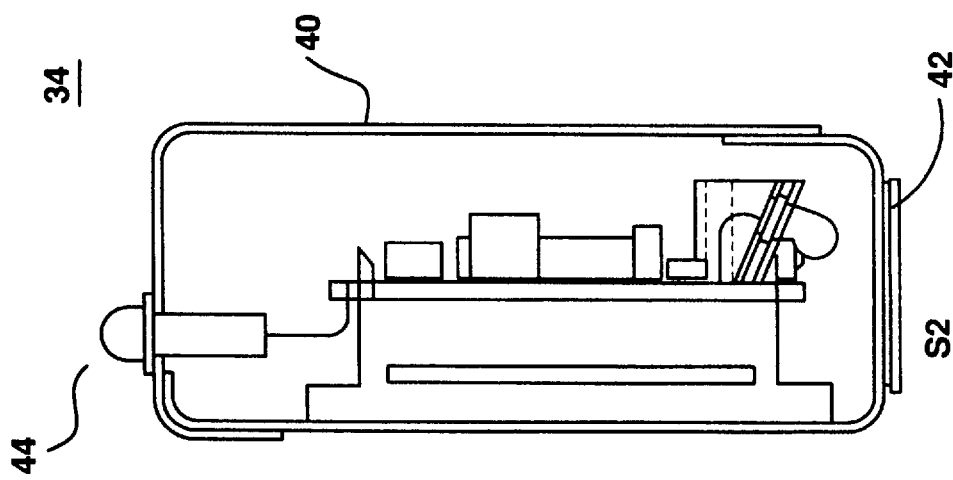
Figure 4A:
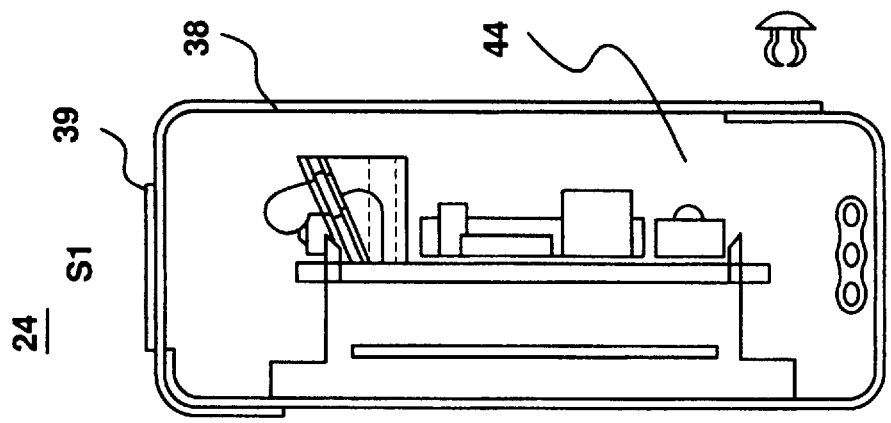

Referring now to FIG. 4A, one form of the emitter 24 is shown as comprising a case 38 which encloses electronic components for emitting the upwardly directed optical signal S1 through a transparent window 39 in the case 38. The emitter 34 shown in FIG. 4B similarly comprises a case 40 which incorporates electronic components for emitting the downwardly directed optical signal S2 through a transparent window 42 in the case 40 in the direction of passengers approaching the train. Both emitters 24 and 34 include means in the form of fault indicators 44 for providing an indication of loss of operation to the emitters and thus any termination of their assigned function. This allows the emitters on each door on the train to be individually sensed for fail safe operation. The fault indicators 44 function to provide a local or remote separate indication of any operational failure to one or more arrays or emitters 24 and 34. When a fault occurs the holder of the detector 30 can receive a signal indicating that it is not safe to enter that area.

FIG. 4C is a cross section of a diagram of a standard power supply 58 that can be used to power the emitters 24 and emitters 34.

FIGS. 5A and 5B show side and top views of the detector 30, respectively. FIG. 5C is a diagram of how the detector 30 is positioned so as to be functional.

In FIGS. 5A–5C the detector 30 comprises two radiation sensitive elements which are directional detectors 46 and 48. The directional detectors 46 and 48 are mounted at an angle to each other. The directional detector 46 is oriented to receive the signal S1 from the emitters 24 and the directional detector 48 is oriented to receive the signal S2 from the emitters 34. The directional detectors 46 and 48 can include broad band sensors that receive a large spectrum of frequencies. Electronic and optical filters are provided within the detector 30 for each of the directional detectors 46 and 48 so that they respond only to a specific coded frequency. Therefore, the directional detectors 46 and 48 are tunable. This allows the system and device to be effective and functional in an environment containing other optical or infrared signals, for example, where lights from a train or platform have optical content that could interfere with the operation of the IRIIS. A housing 50 of the detector 30 is made of a material that provides shielding from electromagnetic interference radiation. Further, the electronic components within the detector 30 are particularly designed to permit operation where high constant levels of optical signals are present, such as in bright sunlight.

FIG. 6 is a diagram of an example of a holder 52 for the detector 30. The holder contains openings for receiving detectors 30. Contacts 53 on the bottom of the detectors 30 act as a switch to turn power ON and OFF. That is, when the contacts 53 on the detector 30 contact the contacts 53A within an opening in the holder 52, the detector 30 is turned OFF. When the detector 30 is removed from the holder 52, the detector is turned ON.

As described earlier, a traveler will approach the platform edge 14 for the purpose of boarding a train or other means of transportation. Upon the emitters 24 emitting a beam S1 and the detector 46 receiving the beam S1 and providing a pulsed vibrotactile output, the traveler can turn either to the right or left and walk along the platform 12 until arriving at a point alongside the coach 32 at which time interception of the beam S2 by the detector 48 will occur. In this embodiment, the signal S2 causes the pulsed vibrotactile output triggered by receipt of the signal S1 to transition to a continuous vibrotactile output which indicates to the traveler that an open door is in front of him or her.

The hardware and electronics for the present invention include specially designed components. These include, for example, a special rail for attaching the emitters 24, a fault detector system for determining non-functioning of one or more of the emitters 24 or 34, etc. Further, the mounting of the emitters 24 along the platform edge 14 and emitters 34 above the doors of the railway cars is both reasonably inconspicuous and unintrusive in a rail station environment. The use of the detection system of the present invention is entirely on a voluntary basis and, as an example, a central control center within each railway station would have in stock a sufficiently large number of portable warning devices for elective distribution to the blind or visually impaired traveler upon entering the system with the acknowledgment, tacit or otherwise, that the detector be returned to the center once the traveler exits the rail system. As another example, frequent users of the system could purchase or lease one of the detectors.

The above-described embodiment of the present invention has been demonstrated experimentally and it has been determined that no extensive training of a visually impaired or blind user is required to develop the skill necessary for safe approach to a platform edge and safe boarding of the car. Lastly, the present invention does not compromise the established safety and operational requirements of any conventional transit system.

As will be appreciated from the foregoing description, the disclosed IRIIS technology and design for warning blind or visually impaired travelers that they are approaching a platform edge of in a transit station coupled with the nearly simultaneous indication that open doors of a car are directly in front of the traveler is far superior, in results obtained, to any other conventional warning system, both functionally and aesthetically.

The present invention is not limited to railway and transit systems as shown in the drawings and described above as examples explaining the present invention. The present invention can be used, for example, in entrances, exits, fare machines, restaurants, escalators, elevators, buses, telephones, and the like. Additional information can also be transmitted to a traveler for the purposes of providing guidance and knowledge of his or her environment.

The foregoing is considered as illustrative only of the principles of the invention. Further, since numerous modifications and changes will readily occur to those skilled in the art, it is not desired to limit the scope of the invention to the exact construction and applications shown and described. Accordingly, all suitable modifications and equivalents may be resorted to, falling within the scope of the invention and the appended claims and their equivalents.

We claim:

1. In a transportation system of the class wherein a vehicle has an assigned route which takes it into proximity with the edge of a passenger-boarding platform frequented by visually handicapped persons who in the course of boarding the vehicle face possible hazards if their approach to a boarding area on the platform places them in the path of a vehicle as it arrives at the platform for the purpose of taking on or discharging passengers, the combination with said system of a plurality of emitters mounted on said platform, each of said emitters emitting encoded radiation in the infrared region which is projected upwardly to intercept said boarding area to create a hazard zone within said boarding area, and a detector mounted on or carried by said persons and being tuned to the emitted encoded radiation from said emitters and activated when said persons enter said hazard zone.

2. The system of claim 1, wherein the radiation patterns of adjacent ones of said plurality of emitters laterally overlap each other within said boarding area.

3. The system of claim 1, wherein said detector issues a warning signal upon being activated by said emitters thereby warning such persons of entry into said hazard zone.

4. The system of claim 3, wherein said warning signal comprises vibrotactile stimulation.

5. In a transportation system of the class wherein a passenger-carrying vehicle is scheduled to stop proximate to the edge of a boarding platform frequented by vision impaired individuals who in the course of boarding the vehicle without human assistance expose themselves to possible hazards if their walk to a boarding area on said platform succeeds in placing them in the path of an arriving vehicle intent on taking on or disembarking passengers once brought to a halt, the combination with said system of a plurality of emitters mounted on said platform each of which emits encoded radiation in the infrared region in the direction of said boarding area whereby a hazard zone of predetermined length and depth along the edge of said platform is created, and a detector mounted on or carried by said vision impaired individuals having a reception spectrum tuned to the signals from said emitters and activated when said vision impaired individuals enter the hazard zone.

6. The system of claim 5, wherein said detector gives a warning signal upon being activated thereby alerting the visually impaired individuals of entry into said hazard zone.

7. The system of claim 6, wherein said warning signal comprises vibrotactile stimulation.

8. In a transportation system of the class wherein a passenger-carrying vehicle is scheduled to stop in proximity to the edge of a passenger-boarding platform frequented by vision impaired individuals who during the course of boarding the vehicle without human assistance may compromise their safety if their approach to a boarding area on said platform succeeds in placing them in the path of a vehicle moving past the platform, apparatus dedicated to the protection of said individuals comprising:

a plurality of means mounted on said platform each for generating an optical signal, said signals being directed upwardly toward a boarding area on said platform, said boarding area being configured to demarcate a hazard zone having a predetermined length extending parallel to the edge of said platform and having a predetermined width perpendicular to and extending in a direction inboard of the edge of said platform; and means, mounted on or carried by said individuals having a reception spectrum tuned to said optical signals, for issuing a warning to said individuals when said individuals enter said hazard zone.

9. The system of claim 8, wherein said means for generating said optical signals emit radiation in the infrared spectrum and said means for issuing a warning is sensitive to the infrared radiation incident thereon.

10. The system of claim 8, wherein said means for issuing a warning issues a warning signal upon being activated thereby alerting such persons to entry into said hazard zone.

11. The system of claim 10, wherein said warning signals comprise vibrotactile stimulation.

12. In a transportation system of the class wherein a passenger-carrying vehicle has an assigned route which brings it into proximity with the edge of a passenger-boarding platform frequented by visually handicapped individuals who in the course of boarding a vehicle without human assistance may find themselves in danger if their approach to the edge of the platform succeeds in placing them in the path of an arriving vehicle as it moves towards the platform, the combination with such system of a plurality of emitters mounted on said platform, said emitters each emitting in an upward direction a detectable optical signal which covers a selected portion of said platform large enough to create a hazard zone having a predetermined length and depth within the boarding area on said platform, and a detector mounted on or carried by the visually handicapped individuals having a reception spectrum tuned to the signals from said emitters and activated when the visually handicapped individuals enter said hazard zone.

13. The system of claim 12, wherein said detector is sensitive to the infrared radiation incident thereon.

14. The system of claim 12, wherein said detector issues a warning signal on being activated thereby notifying such individuals of entry into said hazard zone.

15. The system of claim 14, wherein said warning signal comprises vibrotactile stimulation.

16. The method of improving the safety of vision impaired individuals during their approach to a rail transportation vehicle with the intention of boarding the vehicle from a platform unassisted by other individuals, said method comprising the steps of:

a) identifying a boarding area on the platform;

b) establishing within the boarding area a hazard zone which covers a predetermined distance inwardly from an edge of the platform;

c) exposing the hazard zone to detectable optical signals radiated from multiple points on the platform;

d) equipping the vision impaired individuals with a detector; and e) using the optical signals to activate the detector upon entry of the vision impaired individuals into the hazard zone.

17. The method recited in claim 16, wherein said step c) of exposing the hazard zone includes using an infrared signal emitting device.

18. The method recited in claim 17, wherein the detector responds to infrared radiation.

19. The method recited in claim 16, further comprising the step of:
f) producing, from the detector, a warning signal once the detector becomes activated.

20. The method recited in claim 19, further comprising the step of:
g) making the warning signal affect the vision impaired individuals through vibrotactile stimulation.

21. In a transportation system of the class where a vehicle has an assigned route which takes it into proximity with the edge of a passenger-boarding platform frequented by visually handicapped persons who in the course of boarding the vehicle face possible hazards if prior to boarding the vehicle they place themselves in the space between adjoining vehicles rather than directly in front of the doors, the combination with said system of an emitter mounted directly above each door on said vehicle, each of said emitters downwardly emitting encoded radiation in the infrared region when the vehicle has stopped at the platform with its doors open, and a detector, mounted on or carried by the visually handicapped persons and being tuned to the signals from said emitters and activated when the visually handicapped persons intercept the signals.

22. The system of claim 21, wherein said detector issues a warning signal upon being activated by the signals from said emitters thereby alerting the visually handicapped persons of being directly in front of open doors.

23. The system of claim 22, wherein said warning signal comprises vibrotactile stimulation.

24. A transportation system of the class wherein a passenger-carrying vehicle has an assigned route which takes it into proximity with the edge of a passenger-boarding platform frequented by visually handicapped persons who in the course of boarding the vehicle face possible hazards if their approach to a boarding area on the platform places them perilously close to the edge of the platform or the additional hazard of placing themselves inadvertently at the junction of two adjoining vehicles in the mistaken belief that they are standing directly before the open doors of the vehicle, the transportation system including a warning system comprising:
a plurality of first emitters mounted on the platform, each of said first emitters emitting encoded radiation in an optical region which is projected upwardly to intercept a boarding area, creating a hazard zone within the boarding area, said radiation having a first code;
a plurality of second emitters mounted on the vehicle, one of said plurality of second emitters in place directly above each of the vehicles doors, each of said plurality of second emitters emitting encoded radiation, in an optical region, which is projected downward, creating a safe zone directly before the vehicles' doors when the doors are open, said radiation from said plurality of second emitters having a second code;
a detector mounted on or carried by visually handicapped persons having a first reception spectrum tuned to the encoded radiation from said first emitters and having a second reception spectrum tuned to the encoded radiation from said second emitters, said detector being activated to produce a first warning when the visually handicapped person enters said hazard zone and to produce a second warning when the visually handicapped persons enter said safe zone.

25. The system of claim 24, wherein said first warning comprises vibrotactile stimulation of an interrupted frequency and said second warning comprises vibrotactile stimulation having a substantially continuous frequency.

26. An alarm system for visually handicapped persons, comprising:
a plurality of first emitter means for emitting first optical signals in an upwardly directed direction;
a plurality of second emitter means for emitting second optical signals in a downwardly directed direction;
detector means, mounted on or carried by the visually handicapped persons, having a first reception spectrum tuned to said first optical signals from said first emitter means and having a second reception spectrum tuned to said second optical signals from said second emitter means;
warning means for issuing a first warning upon detection of said first optical signal indicating a hazard zone is being entered and issuing a second warning upon detection of said second optical signal indicating a forward region representing an open door.

27. A system according to claim 26, wherein said optical signals are emitted in the infrared spectrum.

28. A system according to claim 26, wherein said detector means is coupled to a person.

29. A system according to claim 28, wherein said detector means is held by said person.

30. A system according to claim 28, wherein said detector means is attached to said persons body.

31. A system according to claim 26, wherein said detector means comprises:
first directional detector means for detecting said first optical signals emitted from said first emitter means; and
second directional detector means for detecting said second optical signals emitted from said second emitter means.

32. A system according to claim 31, wherein said first and second warning signals include audio signals.

33. A system according to claim 31, wherein said first and second warning signals include tactile signals.

34. A system according to claim 31, wherein said first and second warning signals include vibrotactile stimulation.

35. A system according to claim 31, wherein said hazard zone is formed by overlapping said first optical signals from said first emitter means.

36. A system according to claim 26, wherein said first and second emitter means each include fault indicator means for alerting said detector means of a fault in one of said first and second emitter means.

37. A method for providing an alarm, said method comprising the steps of:
a) emitting first optical signals from a first emitter in an upward direction;
b) emitting second optical signals from a second emitter in a downward direction;
c) detecting, with detecting means, the first and second optical signals;
d) issuing a first warning, from the detector means, indicating a hazard zone, upon receiving the first optical signals; and
e) issuing a second warning, from the detector means, indicating an open door, upon receiving the second optical signals.

38. A method according to claim 37, wherein the optical signals are in the infrared spectrum.

39. A method according to claim 37, wherein the detecting in said step c) includes using first and second directional detectors.

40. An alarm system according to claim 26, wherein said first and second emitter means comprise:

a casing;

a transparent window in said casing;

an element inside said casing, for emitting said optical signals, said optical signals passing through said transparent window in said casing;

fault detector means for issuing a signal indicating that one or more of said first and second emitter means are not functioning; and power source means coupled to said first and second emitter means for supplying power to said first and second emitter means.

41. A system according to claim 40, wherein said detector means comprises:

a housing impervious to electromagnetic radiation;

first directional detector means, within said housing, for receiving said first optical signals from said first emitter means;

second directional detector means, within said housing, for receiving said second optical signals from said second emitter means, said first directional detector means including a first sensor and said second directional detector means including a second sensor;

filter means for receiving and filtering said first and second optical signals; and power source means for providing power to said system.

* * * * *